United States Patent
Storn

(10) Patent No.: US 6,842,517 B2
(45) Date of Patent: Jan. 11, 2005

(54) METER PULSE FILTERING CIRCUIT FOR ANALOG MODEMS

(75) Inventor: Rainer Storn, Kirchheim (DE)

(73) Assignee: Infineon Technologies AG, Munich (DE)

( * ) Notice: Subject to any disclaimer, the term of this patent is extended or adjusted under 35 U.S.C. 154(b) by 522 days.

(21) Appl. No.: 09/793,790

(22) Filed: Feb. 26, 2001

(65) Prior Publication Data

US 2001/0019607 A1 Sep. 6, 2001

Related U.S. Application Data

(63) Continuation of application No. PCT/DE99/02413, filed on Aug. 2, 1999.

(30) Foreign Application Priority Data

Aug. 25, 1998 (DE) .......................................... 198 38 567

(51) Int. Cl.[7] .............................. H04M 1/00; H04M 9/00
(52) U.S. Cl. .................. 379/392; 379/391; 379/114.01; 379/361; 379/386; 379/390.02; 379/402
(58) Field of Search ............................. 379/114.01, 402, 379/386, 390.02, 391–392, 361

(56) References Cited

U.S. PATENT DOCUMENTS

| | | | |
|---|---|---|---|
| 3,174,111 A | * | 3/1965 | Grover ........................ 330/284 |
| 3,729,687 A | * | 4/1973 | Orlandini et al. .............. 330/51 |
| 4,701,947 A | * | 10/1987 | Stader ......................... 379/124 |
| 5,497,417 A | | 3/1996 | Brahms et al. |

FOREIGN PATENT DOCUMENTS

EP      0 608 182 A1      7/1994

OTHER PUBLICATIONS

Didier Haspeslagh et al.: "A Four–Channel Digital Signal Processor in 1.2–$\mu$m CMOS with On–Chip D/A and A/D Conversion Serving Four Speech Channels in a New Generation Subscriber Line Circuit", IEEE Journal of Solid–State Circuits, vol. 26, Jul. 1991, No. 7, pp. 1038–1045.

* cited by examiner

Primary Examiner—Curtis Kuntz
Assistant Examiner—Alexander Jamal
(74) Attorney, Agent, or Firm—Laurence A. Greenberg; Werner H. Stemer; Gregory L. Mayback

(57) ABSTRACT

A filtering circuit is described for filtering out meter pulses of analog telephone communication, for example in analog modems. The circuit is mainly composed of resistors and capacitors and is configured as a double T element or a Wien bridge circuit. The filtering circuit is needed for attenuating interferences to such an extent that integrated circuits operating with low voltages are not overloaded.

4 Claims, 4 Drawing Sheets

METER PULSE FILTERING CIRCUIT FOR ANALOG MODEMS

CROSS-REFERENCE TO RELATED APPLICATION

This application is a continuation of copending International Application No. PCT/DE99/02413, filed Aug. 2, 1999, which designated the United States.

BACKGROUND OF THE INVENTION

Field of the Invention

The present invention relates to a filtering circuit for filtering out the meter pulses of analog telephone connections for use, for example, in analog modems.

Line codecs for analog modems must filter out the meter pulses allowed in Europe (up to approx. 20 dbm0, depending on which country) so that the modem connection is not disturbed.

According to the known prior art, the meter pulse filters have previously been produced by using passive LC filters, i.e. filtering circuits of coils and capacitors. The prior art has the disadvantage that the required coils are relatively large and expensive and the prescribed terminating impedance of the subscriber line cannot be adhered to very accurately in the case of LC filters.

SUMMARY OF THE INVENTION

It is accordingly an object of the invention to provide a meter pulse filtering circuit for analog modems which overcomes the above-mentioned disadvantages of the prior art devices of this general type, which is less expensive and the prescribed terminating impedance of a subscriber line can also be maintained very accurately. Accurate maintenance of the terminating impedance makes it possible to keep the reflection loss low.

With the foregoing and other objects in view there is provided, in accordance with the invention, a filtering circuit for filtering out meter pulses of analog telephone connections. The filtering circuit is formed exclusively of resistors and capacitors connected to the resistors such that an RC filter is formed for filtering out the meter pulses.

According to the invention, the object is achieved by the fact that that filtering circuit contains exclusively of resistors and capacitors and is used as the filtering circuit for filtering out the metering pulses of analog telephone connections. By omitting coils, such a circuit is distinctly less expensive and saves more space and, at the same time, the terminating impedance can be reproduced much better.

An especially preferred feature is to construct the RC filtering circuit in the form of a double-T element or in the form of a Wien-Robinson bridge circuit.

In accordance with an added feature of the invention, two of the resistors are connected in series forming a first series circuit having a center connecting node between the two resistors. Two of the capacitors are connected in series forming a second series circuit having a center connecting node between the two capacitors. A common ground line is provided along with an input line branching and connecting to both the first series circuit and the second series circuit. An output line branches from and connects to both of the first series circuit and the second series circuit on a side opposite to the input line. A further one of the capacitors has a first terminal connected to the common ground line and a second terminal connected to the center connecting node of the first series circuit. A further one of the resistors has a first terminal connected to the common ground line and a second terminal connected to the center connecting node of the second series circuit.

In accordance with another feature of the invention, the further one of the capacitors exhibits twice a capacitance of each of the capacitors in the second series circuit and the further one of the resistors exhibits half a resistance of the resistance of each of the resistors in the first series circuit.

In accordance with an additional feature of the invention, the capacitance of each of the capacitors in the second series circuit is 32.935 nF and the resistance of each of the resistors in the first series circuit is 302 Ω. In addition, a terminating resistance is connected to the output line and has a resistance of 417.63 Ω.

In accordance with a further feature of the invention, the resistors include a first resistor, a second resistor, a third resistor, and a fourth resistor each having a first terminal and a second terminal. The capacitors include a first capacitor and a second capacitor each having a first terminal and a second terminal. A first input terminal is connected to the first terminal of the first resistor and to the first terminal of the second resistor. The first capacitor is connected between the second resistor and the third resistor. A first output line is connected to the second terminal of the first resistor. A second output line is connected to the first capacitor. The fourth resistor is connected to the second terminal of the first resistor. The second capacitor is connected in parallel with the third resistor and together define a parallel circuit, the parallel circuit is connected to the first capacitor. A second input terminal is connected to the parallel circuit and to the second terminal of the fourth resistor.

In accordance with another added feature of the invention, all of the capacitors exhibit an equivalent capacitance. The second resistor and the third resistor have an equivalent first resistance and the first resistor has a second resistance different from the first resistance. The fourth resistor has a third resistance being half of the second resistance.

In accordance with a concomitant feature of the invention, the capacitance of the capacitors is in each case 74.61 nF, the first resistance is 133.3 Ω, and the second resistance is 700 Ω. In addition, a terminating resistor has a resistance of 6 kΩ and is connected to the first output line.

Other features which are considered as characteristic for the invention are set forth in the appended claims.

Although the invention is illustrated and described herein as embodied in a meter pulse filtering circuit for analog modems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
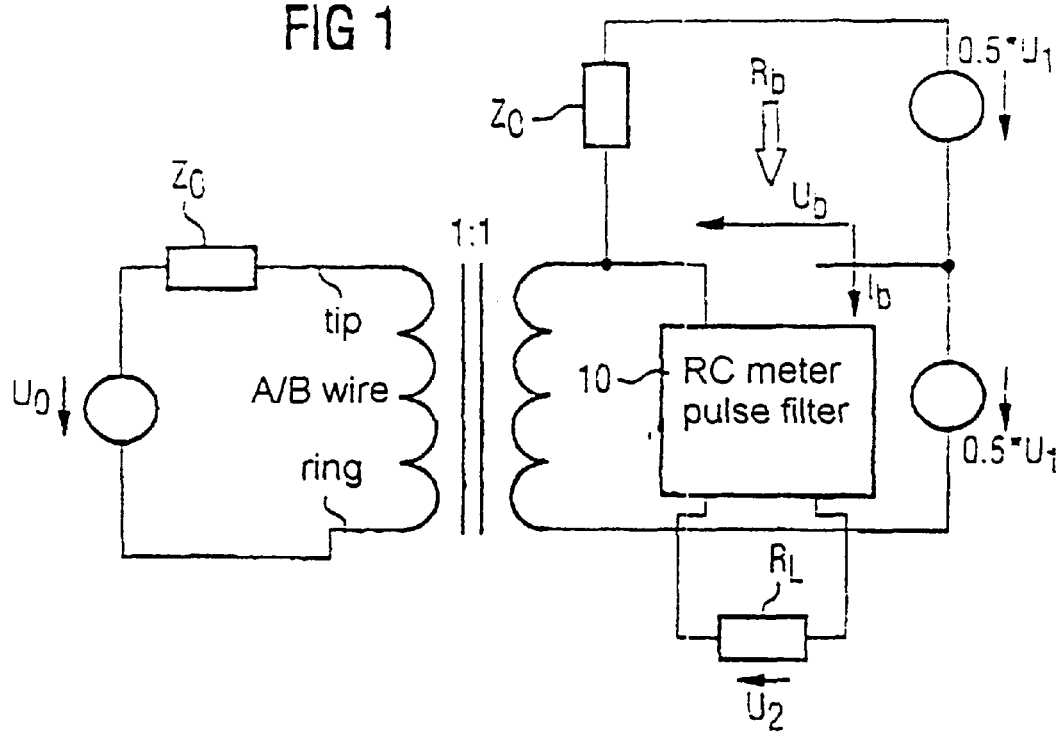
FIG. 1 is a circuit diagram of a bridge circuit for a transformer-based analog hybrid according to the invention.

In all the figures of the drawing, sub-features and integral parts that correspond to one another bear the same reference symbol in each case. Referring now to the figures of the drawing in detail and first, particularly, to FIG. 1 thereof, there is shown a bridge circuit used for transformer-based analog hybrids. A meter pulse filter 10 has the task of filtering out a 16-kHz carrier of the meter pulse to such an extent that any residual interference can be completely eliminated with the aid of an integrated filter (e.g. active RC filter, SC filter or digital filter). The passive meter pulse filter 10 is needed for attenuating the interference to such an extent that the subsequent integrated circuits operated with low voltage are not overloaded. Assuming that the internal impedance of an A/B wire is $Z_0$ (see FIGS. 1 and 4), the voltage is $U_0=0$ if a signal $U_1$ is sent, i.e. there is no talk back. If a remote signal $U_0$ is applied to the configuration of FIG. 1, a useful voltage $U_b$ is dropped across a parallel circuit of $Z_0$ and $R_b$. The transmitted power is at a maximum when $R_b$ is infinite. A case which is also advantageous is obtained if $R_b=K*Z_0$ since $U_b$ is here only attenuated by a real factor $K/(1+2)K=1/(2+1/K)$ compared with $U_0$. Thus, the voltage $U_b$ is present across the meter pulse filter 10 and since the meter pulse filter has an input impedance of $R_b$, the current $I_b$ flows through the meter pulse filter 10. At the output of the meter pulse filter 10, a load impedance $R_L$ is present across which the voltage $U_2$ is dropped.

Figure 2:
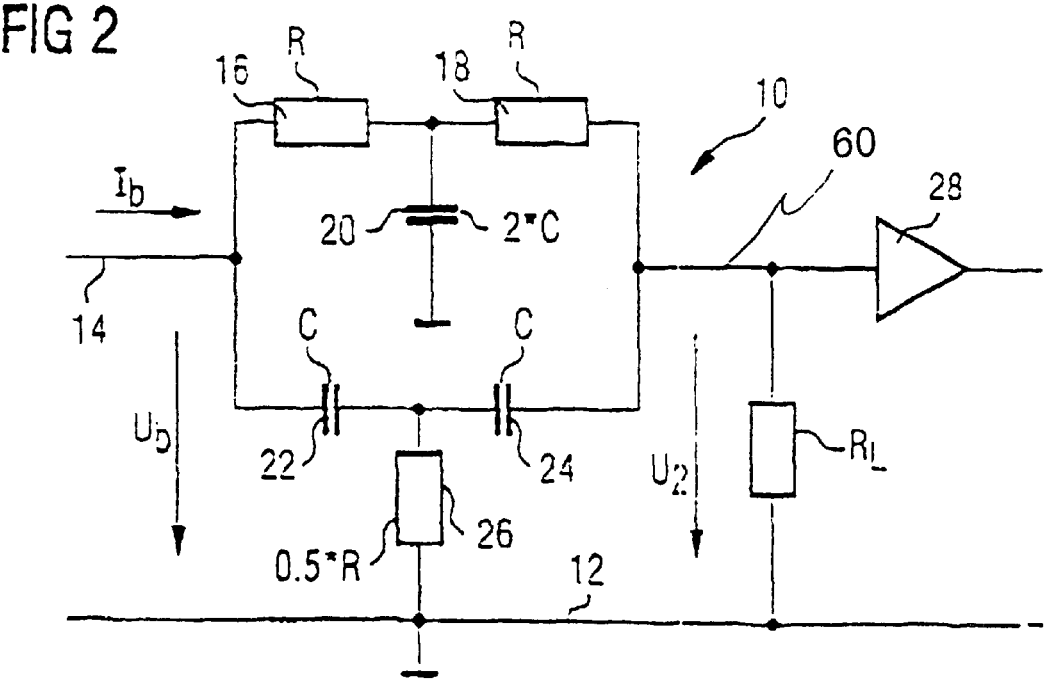
FIG. 2 is a circuit diagram of a RC meter pulse filter with a double-T structure.

The construction of the meter pulse filter 10 is shown in FIG. 2. On the left, an input line 14 is located across which the voltage $U_b$ is dropped and in which the current $I_b$ flows. In the present embodiment, a double T circuit is used. An input and output of the filtering circuit 10 have a common ground line 12. This can correspond to the ground of the modem circuit. The input line 14 leads to two series-connected resistors 16, 18 which in each case have a value of R=302 Ω. Between the two resistors 16, 18, a capacitor 20 having the capacitance 2C=65.87 nF is disposed, the other terminal of which is at ground, that is to say connected to the line 12.

From the input line 14, another line branches off which leads to two series-connected capacitors 22, 24 which in each case have the capacitance C=32.935 nF. Between the two capacitors 22, 24, a resistor 26 with a resistance of 0.5*R=151 Ω branches off which is also connected to the ground line 12. The other terminals of the resistor 18 and the capacitor 24 are connected together again and form an output connection 60 at which the output voltage $U_2$ is present to ground. The output 60 is terminated by the load resistor $R_L$. With the dimensioning of the components described, the value of $R_L$ should be $R_L$=417.63 Ω. The output 60 also leads to the input of a high-impedance amplifier 28 of the line codec of the modem.

Figure 3:
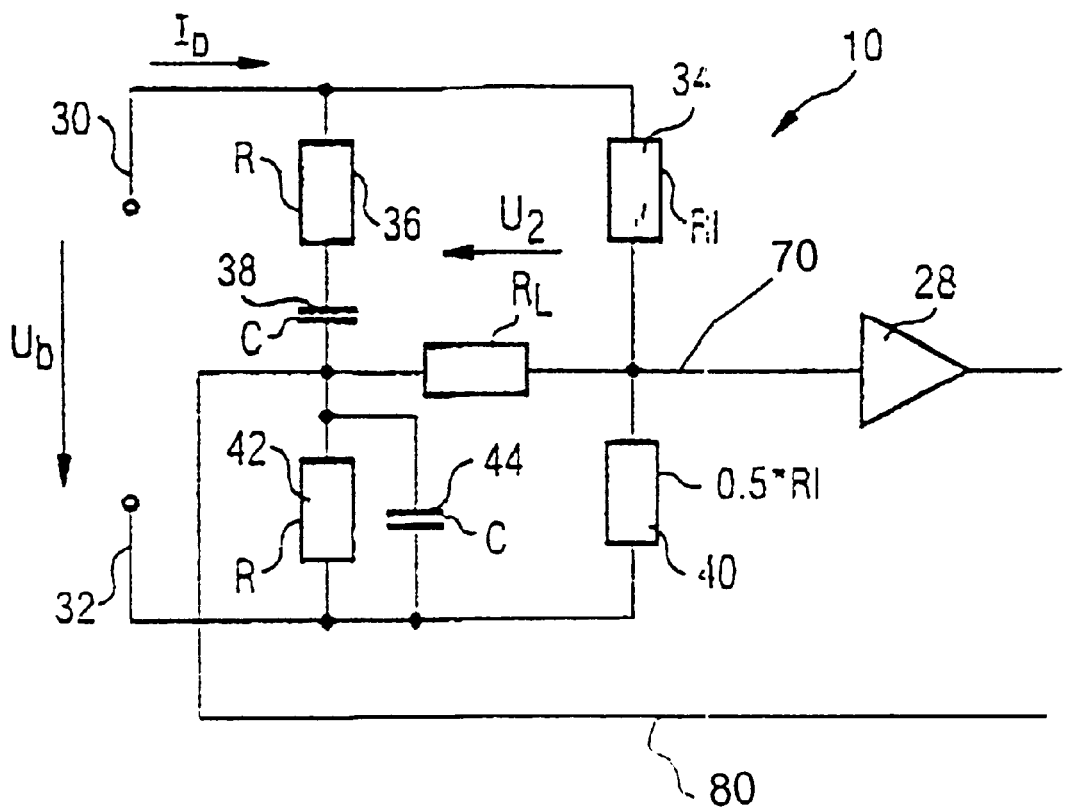
FIG. 3 shows the RC meter pulse filter with the structure of a Wien-Robinson bridge.

FIG. 3 shows another embodiment of the meter pulse filtering circuit 10 according to the invention. This is constructed as a Wien-Robinson bridge circuit. At input connections 30, 32, the input voltage $U_b$ is again present, the input current $I_b$ flows into the input connection 30. The input connection 30 branches to a first resistor 34 with a resistance of $R_1$=700 Ω and to a series circuit of another resistor 36 with a resistance of R=133.3 Ω and a capacitor 38 with a capacitance of C=74.61 nF. Another terminal of the resistor 34 and another connection of the series circuit is in each case connected to one output line 70, 80, respectively. At the output terminal of the first resistor 34, another resistor 40 with a resistance of $0.5*R_1$=350 Ω is also connected, another terminal of which is connected to the second input connection 32. At the output end of the series circuit, the parallel circuit of another resistor 42 with a resistance of R=133.3 Ω and another capacitor 44 with the capacitance of C=74.61 nF is also connected. The other end of the parallel circuit formed of the resistor 42 and the capacitor 44 is also connected to the other input connection 32. At the output line 70, the voltage $U_0$ is again dropped across the load resistor $R_L$ which in this case has a resistance of 6000 Ω. The transfer from the output connections to the modem is again carried out via the high-impedance input amplifier 28 of the line codec.

Figure 4:
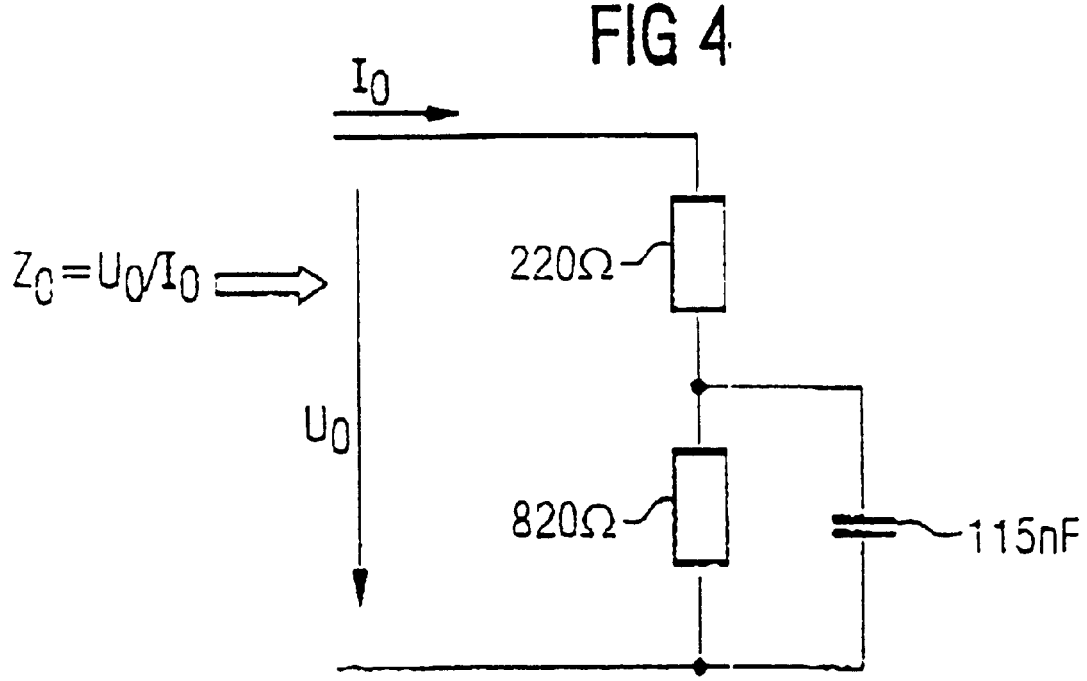
FIG. 4 is an equivalent circuit diagram for a terminating impedance $Z_c$ for analog telephone lines required in Germany.

The relation $\omega=1/RC$ holds both for the filtering circuit shown in FIG. 2 and that shown in FIG. 3, $\omega_c=2*\pi*16$ kHz being applicable in the case of the meter pulse. In the calculation of the components, the terminating impedance $Z_0$ of the A/B wire required in Germany was used as a basis. The corresponding equivalent circuit of the impedance $Z_0=U_0/I_0$ is shown in FIG. 4. The complex terminating impedance $Z_0$ is represented by the series circuit of a resistor of 220 Ω with the parallel circuit of a resistor of 820 Ω and a capacitor of 115 nF.

To determine the optimum component values for the double-T circuit shown in FIG. 2, a non-linear optimization of the component value to the least deviation of the resistance $R_b=U_b/I_b$ from $Z_0$ was performed and K was set to K=1.

Figure 5:
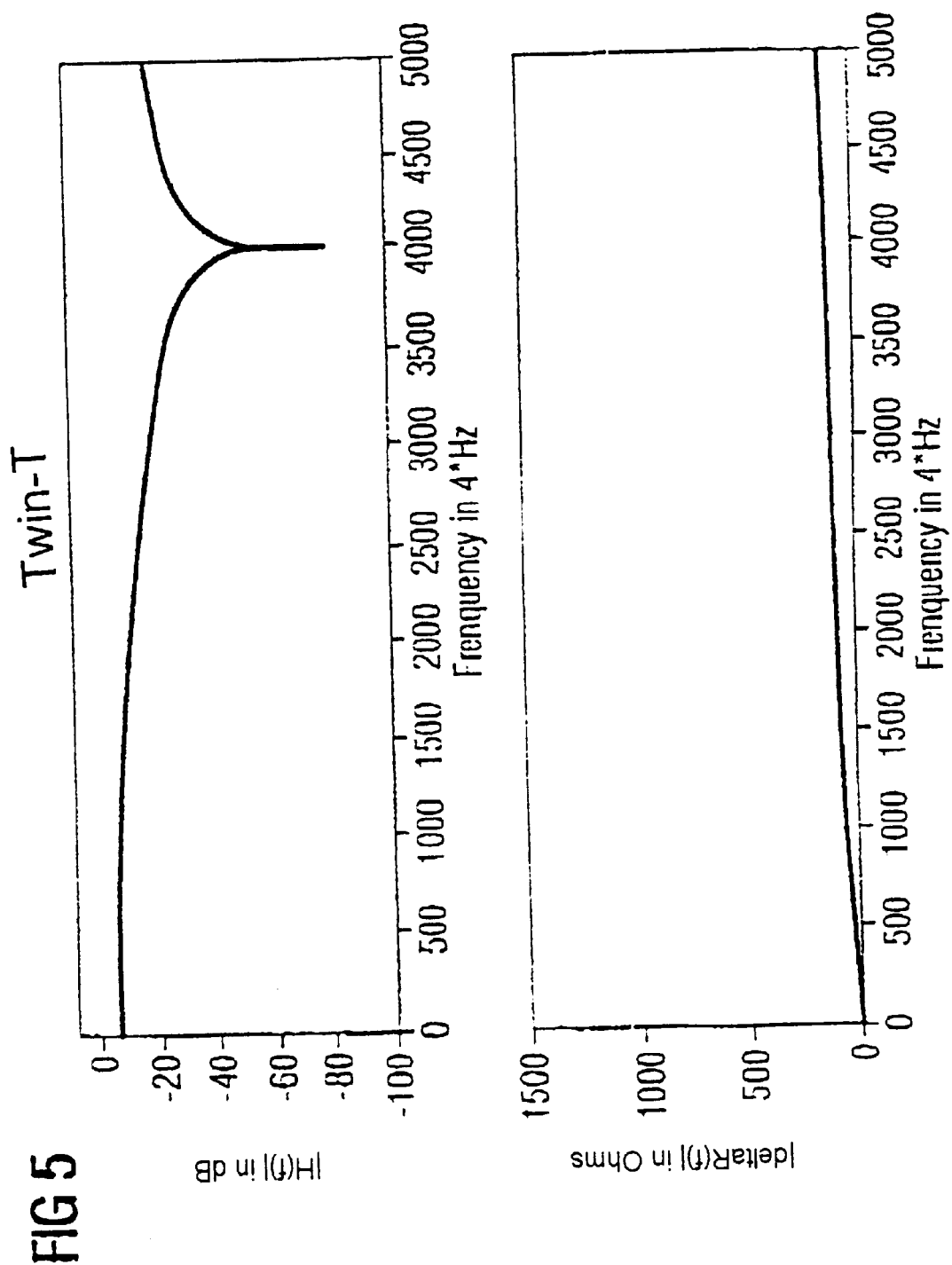
FIG. 5 is a graph showing a transfer function H (f) and a difference in impedance $\Delta R(f)=Z_0-U_b/I_b$ for the circuit according to FIG. 2.

FIG. 5 represents the characteristic of an absolute value of the transfer function H(f) and a difference in impedance $\Delta R(f)=Z_0-U_b/I_b$ for the circuit according to FIG. 2, using the optimum component values found during the non-linear optimization. These are:

C=3.293493383480940e−008 Farad
RL=4.176301881676324e+002 Ohm
R=3.020253203827645e+002 Ohm An optimization of the component values can also be performed for the Wien-Robinson bridge circuit of FIG. 3. Here, too, an optimization to the least deviation of the resistance $R_b$ from $Z_0$ and the case of K=1 is taken as a basis. $Z_0$ is also selected as represented in FIG. 4.

This results in the following optimum component values:

C=7.4610e−008 Farad
R=133.3224 Ohms
R1=700 Ohms
RL=6000 Ohms

Figure 6:
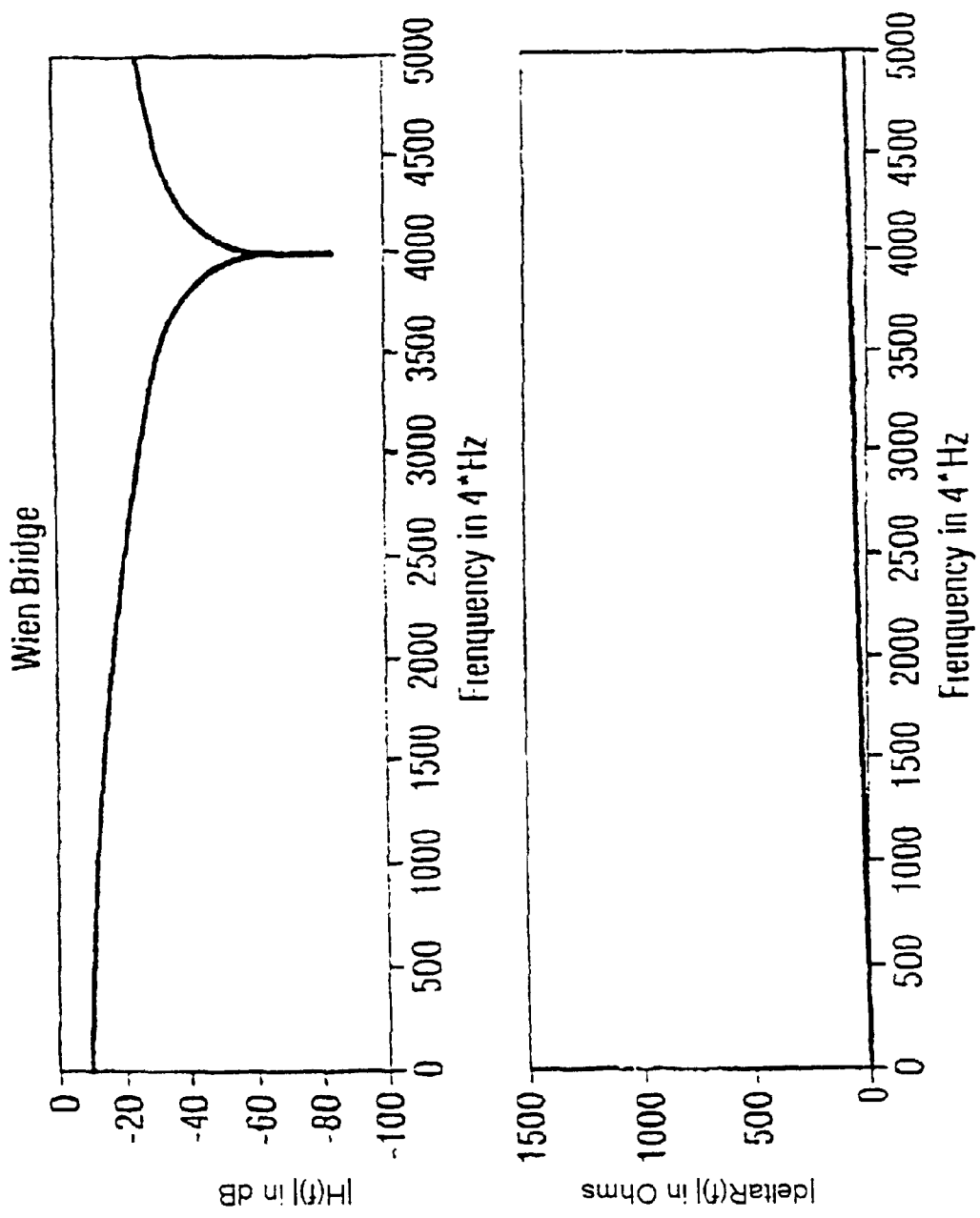
FIG. 6 is a graph of an absolute value of the transfer function H(f) and of the difference in impedance $\Delta R(f)=Z_0-U_b/I_b$ for the circuit according to FIG. 3.

This results in the characteristic of the absolute value of the transfer function H(f) shown in the attached FIG. 6 and the difference in impedance $\Delta R(f)=Z_0-U_b/I_b$ for the circuit according to FIG. 3.

Apart from the advantage of a good reproduction of $Z_0$ by $R_b$, the circuit according to FIG. 2 and FIG. 3 has the disadvantage, however, that the input signal is attenuated. However, this attenuation can be compensated for without problems with the aid of a low-noise preamplifier that is generally present in modems in any case. Naturally, optimization of the components can be performed not only in accordance with a minimum deviation from the impedance $Z_0$ according to FIG. 4 but also in accordance with other criteria such as, for example, minimum signal attenuation. A weighted optimization of a number of objective functions is also possible.

Up until now, the configuration of filtering circuits for analog telephone signals was always based on the principle of preventing attenuations of the signal in every case. It was due to this bias that only meter pulse filters consisting of coils and capacitors have been previously used in the prior art.

I claim:

1. A filtering circuit for filtering out meter pulses of analog telephone connections, consisting essentially of:

a plurality of resistors;

a plurality of capacitors connected to said resistors such that an RC filter is formed for filtering out the meter pulses;

said resistors and said capacitors connected in a form of a twin-T section;

two of said resistors being connected in series forming a first series circuit having a center connecting node between said two of said resistors;

two of said capacitors being connected in series forming a second series circuit having a center connecting node between said two of said capacitors;

a common ground line;

an input line branching and connected to both said first series circuit and said second series circuit;

an output line branching from and connected to both of said first series circuit and said second series circuit on a side opposite to said input line;

a further one of said capacitors having a first terminal connected to said common ground line and a second terminal connected to said center connecting node of said first series circuit;

a further one of said resistors having a first terminal connected to said common ground line and a second terminal connected to said center connecting node of said second series circuit; and said further one of said capacitors exhibits twice a capacitance of each of said capacitors in said second series circuit and said further one of said resistors exhibits half a resistance of the resistance of each of said resistors in said first series circuit.

2. The filtering circuit according to claim 1, wherein the capacitance of each of said capacitors in said second series circuit is 32.935 nF and the resistance of each of said resistors in said first series circuit is 302 Ω, and including a terminating resistance connected to said output line and having a resistance of 417.63 Ω.

3. A filtering circuit for filtering out meter pulses of analog telephone connections, consisting essentially of:

a plurality of resistors;

a plurality of capacitors connected to said resistors such that an RC filter is formed for filtering out the meter pulses;

said resistors and said capacitors are connected in a form of a Wien-Robinson bridge circuit;

said resistors include a first resistor, a second resistor, a third resistor, and a fourth resistor each having a first terminal and a second terminal;

said capacitors include a first capacitor and a second capacitor each having a first terminal and a second terminal;

a first input terminal connected to said first terminal of said first resistor and to said first terminal of said second resistor;

said first capacitor is connected between said second resistor and said third resistor;

a first output line connected to said second terminal of said first resistor;

a second output line connected to said first capacitor;

said fourth resistor is connected to said second terminal of said first resistor;

said second capacitor is connected in parallel with said third resistor and together define a parallel circuit, said parallel circuit connected to said first capacitor;

a second input terminal connected to said parallel circuit and to said second terminal of said fourth resistor; and all of said capacitors exhibit an equivalent capacitance, said second resistor and said third resistor have an equivalent first resistance, said first resistor has a second resistance different from said first resistance, said fourth resistor has a third resistance being half of the second resistance.

4. The filtering circuit according to claim 3, wherein the capacitance of said capacitors is in each case 74.61 nF, the first resistance is 133.3 Ω, the second resistance is 700 Ω, and including a terminating resistor having a resistance of 6 kΩ and connected to said first output line.

* * * * *